A. SHEDLOCK.
Improvement in Cranks.

No. 128,981.

Patented July 16, 1872.

Witnesses.
John D. Shedlock
William Shedlock

Alfred Shedlock
Inventor

UNITED STATES PATENT OFFICE.

ALFRED SHEDLOCK, OF NEW YORK, N. Y.

IMPROVEMENT IN CRANKS.

Specification forming part of Letters Patent No. 128,981, dated July 16, 1872.

Specification describing a certain "Improved Crank," invented by Alfred Shedlock, of New York, county and State of New York.

My invention consists in the application of a ratchet to the crank-pin, and a pawl or pawls to the connecting-rod of light machinery, such as sewing-machines, &c., the object of which is to prevent the crank running backward, and also to enable the operator to move the crank off the centers by the action of the feet on the treadle, thereby obviating the necessity of applying the hand to the fly-wheel for that purpose.

The accompanying drawing, forming part of this specification, shows my improvement as suited to a crank of two and one-half inches throw.

Figure 1:
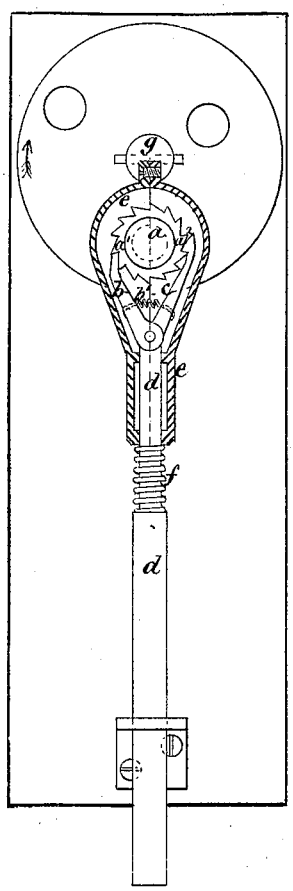
Figure 2:
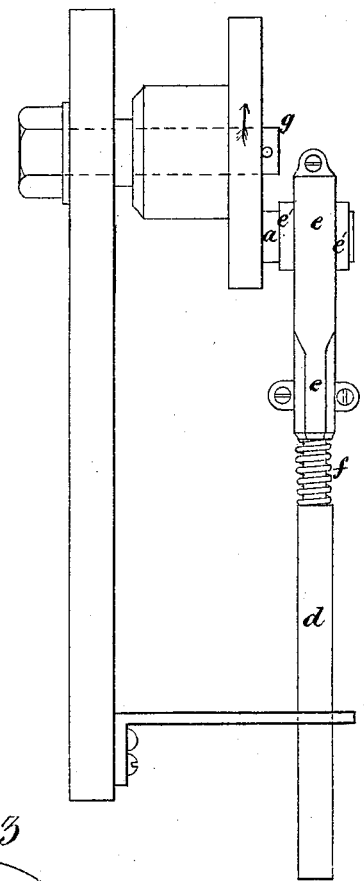
Figure 3:
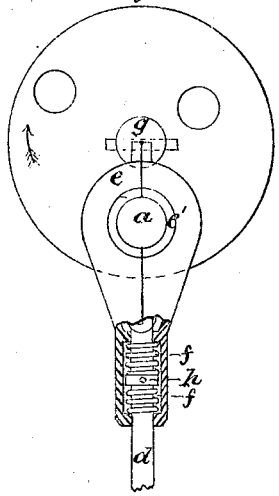

Figure 1 represents a front view partly in section. Fig. 2 is a side elevation, and Fig. 3 is a modification.

$a$ represents a ratchet-wheel attached to or forming part of the crank-pin; $b$, a straight pawl; and $c$, a hooked pawl pivoted at the end of the connecting-rod $d$. $e$ is a box or case parted in the middle and held together by three screws, inclosing the ratchet and pawls, and forming the bearing of the connecting-rod on the crank-pin; $f$ is a spring or springs, as shown at Fig. 3, the object of which will be hereafter explained; $g$, the stud upon which the crank revolves. When the crank-pin is on the lower center, as shown at Fig. 1, the straight pawl $b$ is engaged in the tooth $a^1$ of the ratchet $a$, thereby virtually changing the working-center to that point, or to a distance from the dead-center equal to the radius of the ratchet; then, by pushing on the connecting-rod $d$, which is free to move a certain distance in the box or case $e$, the crank is thrown off the center so that the bearings $e'$ $e'$ of the box $e$ acts upon the crank-pin. When the crank-pin is near the upper center, but not quite on it, the straight pawl $b$ is engaged in the tooth $a^2$ of the ratchet $a$, and by pushing on the rod $d$ the crank is thrown on the center, and then the hooked pawl $c$ is engaged in the tooth $a^1$, and pulls the crank off the center on the downward motion of the connecting-rod $d$. The pawl $c$ pulls the crank-pin on the lower center by engaging in the tooth $a^2$, if the working of the rod and box $e$ does not bring the crank directly on the center. The spring $b'$ is fastened to the two pawls and keeps them against the ratchet $a$. The object of the spring $f$ is for the purpose of preventing the noise there would otherwise be upon the working of the rod $d$ in the box $e$, as the rod is only required to work a certain distance, and would have to shoulder against the bottom of the box $e$. The spring $f$ may be placed inside the box or case $e$. It is preferable to use two springs, $ff$, as shown at Fig. 3, bearing against shoulders on the inside of the box or case $e$ and against a collar, $h$, fastened to the rod $d$.

It is obvious that the crank can only revolve in the direction indicated by the arrow, for then the pawls move over the teeth of the ratchet-wheel; and if it is attempted to turn the crank in the opposite direction then the pawls engage in the teeth and prevent such motion. If it is only required to prevent the crank running backward, then all that would be necessary would be to fasten a ratchet-wheel on the crank-pin and pivot a pawl or pawls on the connecting-rod to engage in the ratchet. To apply my invention to a crank formed in the middle of a shaft, then, it is necessary to make the ratchet in two parts and rivet or screw them onto the crank; or, where a cast shaft is used, the ratchet may be cast thereon.

I claim—

1. A ratchet-wheel applied to the crank, in combination with a pawl or pawls pivoted to the connecting-rod, substantially as and for the purposes set forth.

2. The combination of the rachet $a$, pawls $b$ and $c$, rod $d$, and box or case $e$, constructed substantially as described.

ALFRED SHEDLOCK.

Witnesses:
JOHN D. SHEDLOCK,
WILLIAM SHEDLOCK.